United States Patent [19]

Angell, Jr. et al.

[11] 4,107,258
[45] Aug. 15, 1978

[54] INJECTION MOLDING REDUCED COMBUSTIBILITY HIGH IMPACT STRENGTH POLYETHYLENE ARTICLES

[75] Inventors: Richard Gordon Angell, Jr.; Laurence Herbert Gross, both of Bridgewater, N.J.; Sidney Ethan Berger, Rye, N.Y.

[73] Assignee: Union Carbide Corporation, New York, N.Y.

[21] Appl. No.: 850,353

[22] Filed: Nov. 10, 1977

[51] Int. Cl.$^2$ .............................................. C08K 5/54
[52] U.S. Cl. ........................... 264/328; 260/29.6 XA; 260/29.6 WQ; 260/42.46; 264/329
[58] Field of Search .............. 260/29.6 WQ, 29.6 XA, 260/42.15, 42.46, 42.48, 42.45, 42.44; 264/328, 329

[56] References Cited

U.S. PATENT DOCUMENTS

| | | | |
|---|---|---|---|
| 2,402,805 | 6/1946 | Cousino | 264/329 |
| 2,487,426 | 11/1949 | Cousino | 264/329 |
| 3,066,356 | 12/1962 | Porter | 260/29.6 WQ |
| 3,299,186 | 1/1967 | Wallace | 260/29.6 XA |
| 3,563,939 | 2/1971 | Stevens | 260/37 N |
| 3,741,929 | 6/1973 | Burton | 260/42.46 |
| 3,922,442 | 11/1975 | North | 260/42.15 |
| 3,936,403 | 2/1976 | Sakaguchi | 260/42.46 |

*Primary Examiner*—Paul R. Michl
*Attorney, Agent, or Firm*—Gerald R. O'Brien, Jr.

[57] ABSTRACT

A process is disclosed for the production of injection molded high density polyethylene articles having reduced combustibility and high impact strength comprising: maintaining a mold cavity at a preselected back pressure sufficiently high to substantially prevent foaming of a high density polyethylene material melt to be injected therein; injecting said melt into said mold cavity under pressure in excess of said back pressure to fill said mold cavity; said high density polyethylene material melt containing: (a) from about 50 to 70% by weight of alumina trihydrate, (b) from about 1 to 12% by weight of water as a processing aid, and (c) from about 0.5 to 3% by weight of a methoxy polyethylene glycol propyltrimethoxy silane having the formula:

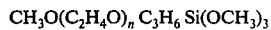

$$CH_3O(C_2H_4O)_n C_3H_6 Si(OCH_3)_3$$

wherein $n$ represents the average number of ethoxy repeat units between 3.0 and 11.0.

8 Claims, 9 Drawing Figures

1% Compatibility Agent NO. 2
300 psi back pressure
Sample dried before testing

FIG. 9

1% Compatibility Agent NO. 2
300 psi back pressure
Sample dried before testing

INJECTION MOLDING REDUCED COMBUSTIBILITY HIGH IMPACT STRENGTH POLYETHYLENE ARTICLES

High density polyethylene injection molded articles which exhibit low combustibility properties would be a desirable addition to the marketplace. Whatever additives are used with the high density polyethylene composition to impart low combustibility properties should also impart low toxicity and low smoke generation and allow the production of articles exhibiting excellent mechanical properties and ease in processing.

One additive which will impart a reduction in the combustibility of high density polyethylene (HDPE) material is alumina trihydrate (ATH), $Al_2O_3 \cdot 3H_2O$. This material does have low toxicity and low smoke generation characteristics. A problem with ATH is that relatively high concentrations (>50% are required to achieve the desired reduction in combustibility. At these levels, processibility and maintenance of excellent impact strength become major problems.

Alumina trihydrate is an effective flame retardant because heat decomposes it endothermically into aluminum oxide and water. Only at temperatures greater than $\sim 230°$ C. does the decomposition occur and then only after the ATH has absorbed 470 cal/gm of ATH. By molding articles containing ATH at temperatures less than 230° C., the ATH will not decompose but will be able to do so in a fire situation.

Although incorporation of ATH in polymeric systems will greatly decrease the system's combustibility the impact strength can only be maintained if there is adequate interaction between the filler and the polymer matrix.

This invention presents a process for molding high density polyethylene articles which have not only reduced combustibility but also excellent impact strength. Processibility of the ATH-filled high density polyethylene compounds is improved by addition of water as a liquid processing aid as well as by use of the specific class of silane compatibility agents described hereinbelow.

In accordance with the present invention, a process is provided for the production of injection molded high density polyethylene articles having reduced combustibility and high impact strength comprising: maintaining a mold cavity at a preselected back pressure sufficiently high to substantially prevent foaming of a high density polyethylene material melt to be injected therein; injecting said melt into said mold cavity under pressure in excess of said back pressure to fill a mold cavity; said high density polyethylene material melt containing: (a) from about 50 to 70% by weight of alumina trihydrate, (b) from about 1 to 12% by weight of water as a processing aid, and (c) from about 0.5 to 3% by weight of a methoxy polyethylene glycol propyltrimethoxy silane having the formula:

$$CH_3O(C_2H_4O)_n C_3H_6 Si(OCH_3)_3$$

wherein $n$ represents the average number of ethoxy repeat units between 3.0 and 11.0.

It is to be understood that the back pressure maintained on the mold cavity may be any pressure sufficient to prevent foaming and preferably at or above 150 psi. Most conveniently a back pressure of the order of about 200 to 450 psi is employed.

It has been found in the practice of the process of the invention that the pressure under which thermoplastic melt is injected into the mold cavity may be any pressure greater than the back pressure of the mold. It has been found preferable, however, to employ a pressure above about 1500 psi and, most preferably, a pressure of about 2500 to 3500 psi as the injection pressure.

It has also been found that, in order to impart to the injection molded articles the desired reduced combustibility characteristics, the melt should contain from about 50 to 70% by weight of alumina trihydrate. The employment of at least about 50% by weight of alumina trihydrate is required in order to achieve the UL 94 V-O characteristics (described hereinbelow) and the employment of greater than about 70% by weight has been found to impart to the melt, flow characteristics which produce processing difficulties. A preferred range of alumina trihydrate content of from about 55 to 65% by weight is desired with the most preferred characteristics being imparted to the melt and resultant injection molded articles at about 60% by weight of alumina trihydrate content.

As discussed in more detail elsewhere herein, the employment of water as a processing aid (in amount from about 1 to 12% by weight) serves to increase the rate of flow of the thermoplastic melt which has been highly filled with alumina trihydrate.

Although the mechanism of the invention is not completely understood, it is believed that water as a processing liquid passes along in the process admixed in the liquid state and, as such, carries over into the molded article as a series of liquid masses, providing no gross foaming characteristics to the resultant molded article. The liquid ultimately diffuses out, leaving an article of slightly lower density and containing some fine pores. This phenomenon is exhibited up to about the volume fraction of the liquid used in the molding.

It is, however, to be understood that it is not the initial processing liquid (water) retention which provides the high combustibility resistance of the articles of the present invention, but rather, the high degree of filling with ATH. This high resistance to combustibility is retained even after the departure of the processing liquid from the resultant articles by difussion.

The equipment suitable for use in the practice of the process of the invention is similar to but modified from that used to process conventional low pressure process structural foam (see, for example, Angell, U.S. Pat. Nos. 3,268,636, 3,436,446 and 3,988,403 and particularly the equipment of FIG. 1 of U.S. Pat. No. 3,436,446).

The additions to the apparatus which enable one to practice the invention are as follows:

First, the conventional structural foam apparatus provides means for the introduction of nitrogen gas into the extruder barrel to produce the foamable material. The process of the present invention requires the introduction of water into the extruder barrel through line 7 of FIG. 1 in place of the gas. As a result of the high pressure ($\sim$1500 psi) and temperature ($\sim$375°–400° F.) in the extruder barrel and the mixing action of the screw, the water introduced is distributed throughout the polymeric compound as it proceeds through the extruder.

The second difference from the conventional low (clamp) pressure structural foam apparatus and that of the apparatus for practicing the invention is at the mold. The conventional structural foam apparatus allows the material melt which enters the mold cavity to expand and produce a foam product. If that procedure were to be used for the water containing compound, the fast rate of pressure drop would cause the water to flash to vapor. This would result in a foamed molded part or imperfections in the body or surface of the part. To inhibit this undesirable feature, the mold cavity is back-pressured with a non-reactive fluid, as for example through conduit 40 in FIGS. 2 or 3, prior to introducing the molten polymeric material. The back pressure is sufficiently high to inhibit most of the water from flashing from the material melt. Hence the articles are essentially solid. For most materials, for the levels of water employed, the pressure required to reduce the flashing is of the order of at least about 100 psi. The actual pressure required to completely inhibit flashing is dependent on the melt temperature and the rheology of the composition. (The final molded parts are known to contain substantially the same amount of water as was introduced in the extruder. Hence, the parts are not absolutely solid polymeric material. In fact, it has been shown that molded parts from which the water has diffused will reabsorb about the same amount of water as was used in the molding. Hence, molded parts do have void-volumes roughly equivalent to the concentration of water incorporated. These are assumed to be pore- or channel-like voids. To reiterate then, the parts appear from visual inspection to be essentially solid. That is, they are not cellular in the sense of structural foam.)

The remainder of the process is substantially non-critical and within the skill of the art. This includes cooling the part sufficiently so that the back pressure may be relieved without foaming or other distortion and the part removed from the mold cavity.

Figure 1:
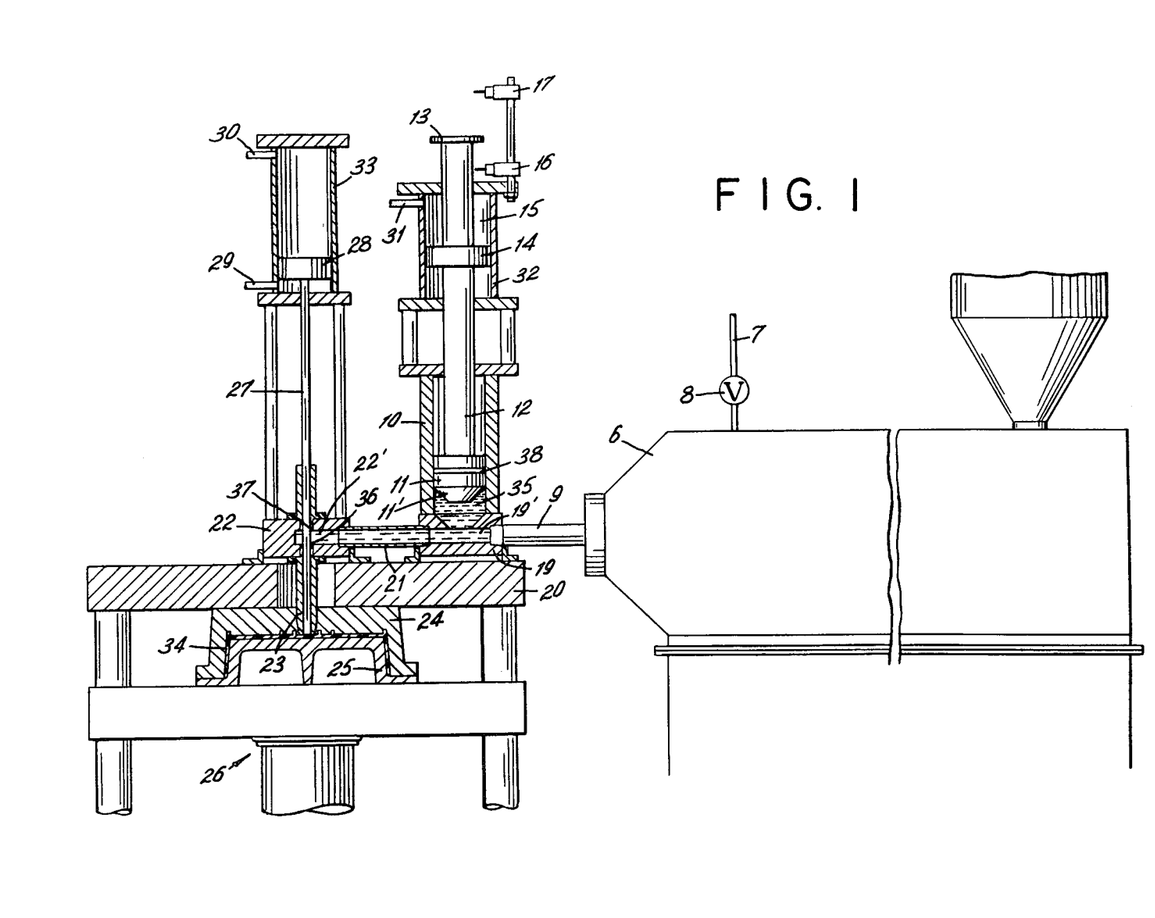
FIG. 1 is a side elevational view substantially in cross-section, of apparatus suitable for the practice of the process of the present invention.

Referring specifically to FIG. 1 of the drawings, the preferred apparatus of this invention for carrying out the present method is shown to include an extruder 6 having attached thereto a line 7 for feeding water as a liquid processing aid directly into the barrel of extruder 6. A valve 8 is provided on line 7 to control the feeding. Line 9 connects the extruder 6 to the internal conduit 19' of a base member 19 which is shown resting on a suppoort member 20. Extending upward from the base member 19 is an accumulator device which includes a cylinder 10 and a piston 11 reciprocally movable therein. The piston 11 is shown having a frusto-conical head 11' and is machined to nearly the same diameter as cylinder 10 to provide a seal between the cylinder 10 and the piston 11. Attached to the rear of piston 11 and extending upward therefrom is a shaft 12.

A flange member 13 is attached to the other end of the shaft 12 and a piston 14 is located on the shaft at a position intermediate the piston 11 and the flange 13. The piston 14 is adapted to reciprocate within a piston housing 32. It should be noted that flange 13 is located at the uppermost functional end of the shaft 12 and need not be located at the actual physical end thereof. The configuration of the flange 13 is critical only to the extent that it must extend from the shaft 12 and contact switches 16 and 17 during the reciprocal movement of the shaft 12.

Alternatively, photoelectric type switches can be employed if desired, thus eliminating the need for a projecting member on the shaft 12. A pair of photoelectric units can be positioned such that shaft 12 blocks the light path of lower unit when the shaft moves upwardly from its lowest position and blocks the light path of an upper unit when it reaches the desired upper position.

Leading from the internal conduit 19' of the base member 19 is a line 21 which is connected to an internal conduit 22' of a second base member 22 which is also resting on the support member 20. Extending downward from the base member 22, and through the support member 20 is a filling nozzle 23. It should be evident that a plurality of filling nozzles can be employed to mold one or more articles. The lower end of the nozzle 23 extends to and is flush with a mold cavity defined by a male mold half 25 and a female mold half 24. Mold half 24 is conveniently affixed to the support member 20 and the mold half 25 is supported by a reciprocating bed 26 adapted to provide for easy separation of the mold halves 24 and 25 to facilitate product removal. Slidably mounted in the nozzle 23 and the base member 22 is a rod 27. The upper end of the rod 27 is provided with a piston 28 which reciprocates within a piston housing 33. The housing 33 is provided with a pair of conduits 29 and 30 which are alternately connected to a source of gas under pressure.

The operation of the preferred apparatus shown in FIG. 1 is as follows: Thermoplastic high density polyethylene material is fluxed in the extruder 6. Water, as a liquid processing aid, is admitted under pressure directly into the barrel of the extruder by means of line 7 and is admixed therein with the melted thermoplastic. The extruder 6, which is in continuous communication with an expanding accumulation zone 35 is defined by the cylinder 10, the piston 11 and the base member 19, continuously extrudes the mixture of thermoplastic material and liquid processing aid through line 9, into the zone 35, and against the piston 11. As the mixture is fed from the extruder into the zone 35, the piston is forced from its lowermost position to an upper, predetermined position. In FIG. 1, the lower-most position of the piston 11 is reached when the piston 11 comes in contact with the base member 19. The upward travel of piston 11 and piston 14 is resisted by means of a gas under pressure in the region 15 above the piston 14 in the piston housing 32. The phrase "gas under pressure" is intended to include any suitable hydraulic fluid conventionally used in such apparatus. In addition, the region 15 in the piston housing 32 is provided with a conduit 31 which is in communication with a source of gas under pressure. As the material from the extruder forces piston 11 upward, and at the same time forces piston 14 upward, the gas in region 15 is compressed. Since the charging of the zone 35 is opposed by the piston 11, the filling of the zone 35 cannot start until the extruder pressure exceeds the back-pressure of the piston 11. As the piston 11 moves upward, the gas volume in region 15 is decreased and the gas pressure is increased. The extruder pressure must continuously exceed the increasing piston pressure during the expansion of the zone 35. Alternatively, during the expansion of the zone 35, the pressure of the gas in region 15 can be regulated so that a substantially constant force is applied to the piston 14. In any case, the mixture being charged into the expanding zone 35 must be maintained at a pressure above which foaming occurs. While a pressure of as low as about 500 psi will normally prevent foaming of the mixture, pressures of at least 1500 psi have been found to give best results. Pressures in excess of 10,000 psi are usually not required for proper operation of the accumulator device and normally should be avoided because operating expenses increase with increasing pressures.

In addition, the cylinder 10 is provided with heating means, not shown, to maintain the mixture in the molten state and thus prevent solidification of thermoplastic material therein. It should be noted, however, that no heating of the mixture in the cylinder 10 is required. Heat is applied to the mixture in the extruder 6 and is only maintained in the cylinder 10.

The piston 11 travels upward until the flange 13, carried by the shaft 12, contacts the switch 17 located at a predetermined position. In a manner well known in the art, the activation of the switch 17 causes gas under pressure to enter piston housing 33 through conduit 29 and produce an upward motion of the piston 28. The lower end of the rod 27 is thereby withdrawn from the nozzle 23 until it reaches a position indicated by the reference numeral 37. Communication between the mold defined by mold halves 24 and 25 and the zone 35 is thus established. At the instant communication is established, the mixture is forced from the accumulation zone 35 into the mold because the pressure within the region 15, which has now become greater than the pressure within the zone 35, causes the downward motion of the piston 11 until it reaches its lower-most position. If necessary, the line 21 and the base member 22 can be provided with heating means, not shown, to prevent solidification of thermoplastic material therein.

When the piston 11 reaches its lower-most position the zone 35 is essentially collapsed and the flange 13 contacts the switch 16, and in a manner well known in the art, gas under pressure is caused to enter the piston housing 33 through conduit 30 thereby producing a downward movement of the piston 28 and the rod 27. At the instant the rod 27 enters the nozzle 23 at the point 36, communication is terminated between the mold and the accumulation zone 35 at a point where the pressure is above the foaming pressure of the mixture. As the rod 27 travels downward it forces the mixture in the nozzle 23, that is, between the point 36 and the mold, into the mold and the bottom of the rod 27 comes flush with the molded article 34. In this manner, a sprue-free molded article is produced and the formation of an unfoamed slug in the system prevented. After cooling, the mold halves 24 and 25 are separated and the sprue-free molded article 34 is removed. It should be evident that articles can be molded according to the present invention having either a sprue or a depression simply by adjusting the rod 27. While it is preferred to mold sprue-free articles, the configuration of certain molded articles will be able to tolerate a sprue or a depression.

The flow of gas under pressure through conduits 29 and 30 is controlled by means of a valve system actuated by the switches 16 and 17 in a manner well known in the art.

The switch 17 is positioned in accordance with the amount of material which is required to be charged into the mold. The greater the distance between the switches 16 and 17, the greater will be the upward travel of the piston 11. Consequently a larger amount of material will be stored in the accumulation zone 35 and subsequently forced into the mold. Conversely, decreasing the space between the switches 16 and 17 decreases the amount of material which will be forced into the mold.

The temperature of the mold is not critical. Cold molds, e.g. at room temperature, about 20° C. can be used to produce molded articles. Lower mold temperatures are preferred since the time required for cooling the article in the mold is shorter. Higher mold temperatures permit more flow of the molten mixture in the mold prior to cooling than with a cooler mold.

From the foregoing description, it is evident that the process and preferred apparatus of this invention can be employed to rapidly, efficiently, and automatically mold filled thermoplastic articles on a batch, semi-continuous or continuous basis.

The extruder 6 of the apparatus of FIG. 1 of the drawings used in the examples set forth herein employed a 2½ inch diameter screw with a 24:1 length to diameter ratio. A 40 HP DC motor was employed utilizing a silicon control rectifier which pumped approximately 120 lb./hr. at 125 rpm. There were four heating zones on the barrel. The two-stage extruder screw had 24 flights. In the first stage, there were five feed flights at 0.440 inch depth, four transition flights, and four metering flights at 0.110 inch depth. There was a 0.050 inch deep blister at the end of the first stage. After one decompression flight at 0.500 inch depth, in which the fluid injection port was located, there was one transition flight, 6½ metering flights at 0.135 inch depth, and two flights of LeRoy mixing head. A 50 ton press was used with this extruder.

Figure 2:
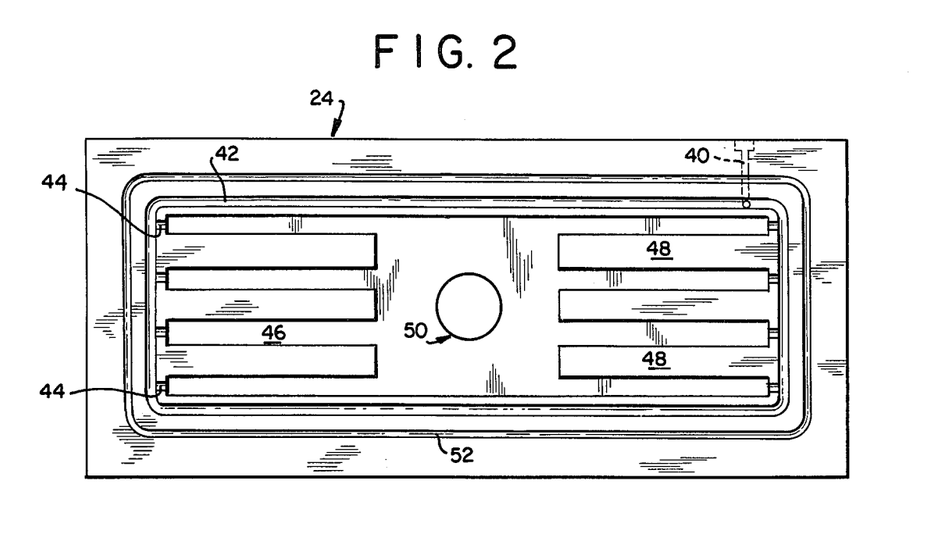
FIG. 2 is a plan view of a finger mold capable of use in practicing the process of the present invention, referred to hereinbelow as Mold No. 1.

In the finger mold 24 (overall dimensions 9 inches × 20 inches), shown in FIG. 2 (Mold No. 1) of the drawings, the back pressure gas was maintained through inlet port 40 (⅜ inch diam., 1½ inch depth) which communicated with gas manifold channel 42 (¼ inch wide, ⅜ inch depth) which, in turn, communicated through ports 44 (3/32 × 1/32 inch) with finger-shaped channels 46 (5⅝ × ½ × ⅜ inch) which were inter-communicating throughout the interior of the mold cavity. The channels 46 were formed between spacer elements 48 (5⅝ × 1 inch). The thermoplastic melt material was introduced into the mold cavity (14 × 5 inches including spacer elements) through fill port 50 (¾ inch diam.). There was an "O"-ring channel 52 (⅛ inch width) on both sides of this mold to reduce the loss of gas from the mold and contain the prescribed back pressure.

Figure 3:
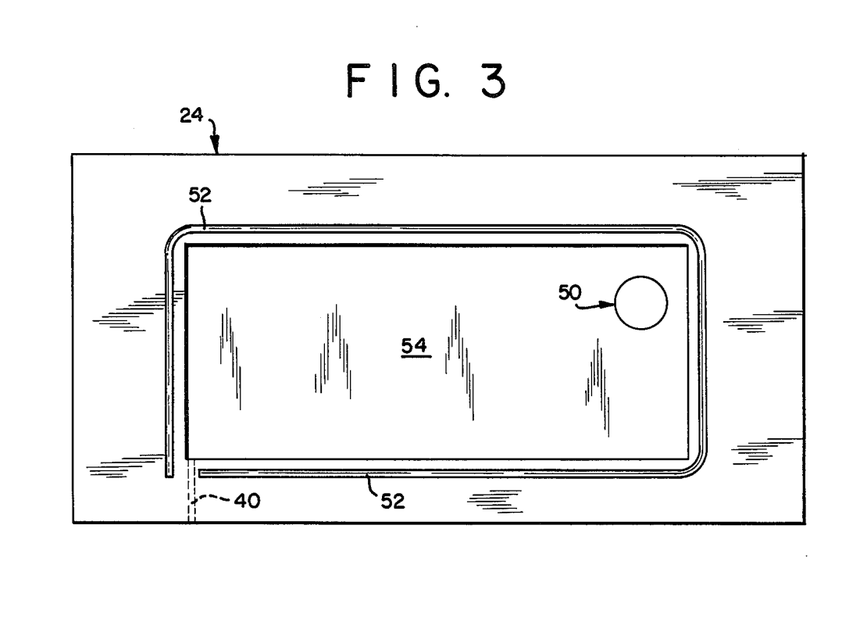
FIG. 3 is a plan view of a cavity mold capable of use in practicing the process of the invention, referred to hereinbelow as Mold No. 2.

In the cavity mold (overall dimensions 12 × 19 inches), shown as a mold half in FIG. 3 (Mold No. 2) of the drawings, the equivalent elements have been assigned identifying numbers identical to those of the finger mold of FIG. 2. The mold cavity of FIG. 3 is designated as element 54 and has dimensions of 13 × 7½ inches, with a half thickness of ¼ inch.

As employed herein in connection with a measure of the combustibility of injection molded thermoplastic articles, it is to be understood that the specifications for degrees of combustibility are those set forth by Underwriters Laboratories Inc. as "Standard For Tests For Flammability Of Plastic Materials For Parts In Devices And Appliances," designated as UL 94 in their specifications dated July 30, 1976 and set forth in Test 3 therein as "Vertical Burning Test For Classifying Materials 94 V-0, 94 V-1 or 94 V-2".

duce a sample which passes the UL 94 V-0 test even in the predried state.

Thus, the present invention presents a process in which a filled thermoplastic material treated with a specific class of silane compatibility agents combine to achieve excellent interfacial interaction and, hence, to yield injection molded articles possessing excellent impact strength and reduction in combustibility. The method of producing the compound to be injection molded has been found to be important. Alumina trihydrate of 1$\mu$ nominal particle size is blended with a compatibility agent which has been diluted in a 90 percent methanol/10 percent water mixture. The preferred means for blending found to date has been 5 minutes in a Henschel mixer. This treated ATH is dried to drive off the methanol (and most of the water). A compound of thermoplastic material and the treated ATH is then made. The preferred method has been found to be 10 minutes of compounding (after fluxing begins) in a Banbury mixer. The process of the invention is then employed to injection mold the filled polymeric articles.

TABLE I

All samples were molded in a 50 ton structural foam machine using a HDPE of $MI = 8$ and specific gravity of 0.96. The ATH used had a 1$\mu$ particle size. The mold was as shown in FIG. 2.

In each case the extruder temperatures were set at 350° F. and the transfer lines and accumulator were set at 370° F. The mold temperature was ~70° F.

TABLE I
(Continued)

| | | | | MOLDING CONDITIONS | | | | ⅜" UL 94 V-0 Results | |
| --- | --- | --- | --- | --- | --- | --- | --- | --- | --- |
| | | | | | | | | PREDRYING | POSTDRYING |
| Parts by wt. of HDPE | Parts by wt. of ATH | Percent by wt. of H$_2$O | Ex. | Fill Time (sec.) | Back Pressure (psi) | Extruder Pressure Barrel (psi) pre fluid | Extruder Pressure Discharge (psi) | Extruder RPM | Test After Molding | Test after drying at 70° C/48 hrs |
| 76.5 | 23.5 | 27 | 1 | — | 400 | 700 | 2900 | 20 | Fail | — |
| 50 | 50 | 0 | 2 | 9 | 0 | 1300 | 3100 | 20 | Fail | Fail |
| 50 | 50 | 18.8 | 3 | 5 | 400 | ~1000 | 2800 | 12 | Fail | Fail |
| 40 | 60 | 5 | 4 | 19 | 425 | 1200 | 3500 | 12 | Pass | Pass |
| 100 | 0 | 0 | 5 | — | — | — | — | — | Fail | — |

The required level of ATH filler addition employed has been found to be dependent on the degree of reduced combustibility desired. To pass the UL 94 V-0 combustibility screening test, high levels of ATH are required. As noted in the following Table I, compounds of 60 percent ATH do pass the UL 94 V-0 flame test for ⅜-inch thick samples whereas compounds of 23.5 percent and 50 percent ATH do not pass the UL 94 V-0 flame test for the ⅜-inch thickness. It should be pointed out that water as a processing aid is not required for attaining a "pass" status in the UL 94 V-0 test for the 60 percent ATH samples. On the other hand, the use of 18.8 percent H$_2$O with 50 percent ATH does not pro- Hence, to attain V-0 levels of reduced combustibility, 60 percent ATH filled HDPE is required. At that level of filler loading, the impact strength of the materials is not very good. To improve the impact strength, a surface treatment agent must be applied to the ATH to improve compatibility of the ATH and the HDPE. A number of compatibility agents have been evaluated, some yielding an improvement in impact strength. A number of methoxy polyethylene glycol propyl trimethoxy silanes were tested which have varying $n$ average ethoxy repeat units in the formula:

$$CH_3O(C_2H_4O)_n C_3H_6 Si(OCH_3)_3$$

The compatibility agents tested and the results of such testing are shown in Table II.

TABLE II

| Compatibility Agent No. | Compatibility Agent |
| --- | --- |
| 1 | Methoxy polyethylene glycol propyl trimethoxy silane with 3 ethoxy repeat units or CH$_3$O(C$_2$H$_4$O)$_n$ C$_3$H$_6$ Si(OCH$_3$)$_3$, where n = 3 on the average. |
| 2 | Same as 1 - except n = 7.2 |
| 3 | Same as 1 - except n = 11. |
| 4 | Same as 1 - except n = 17.5. |
| 5 | Octyl triethoxy silane |

TABLE II-continued $CH_3(CH_2)_7Si(OC_2H_5)_3$

All product samples were molded with 60 parts by wt. of ATH, 40 parts by wt. of HDPE and 1 part by wt. of compatibility agent. Mold temperature of 70° F. in all cases.

| Compatibility Agent Number | Product Number | Percent $H_2O$ | Dart Drop, ¼" After Heat Aging 70° C ≧48 hrs (ft-lb) | Notched Izod ⅜" thick (ft-lb) after same heat aging | Back Pressure on mold (psi) | Fill Time (sec) |
|---|---|---|---|---|---|---|
| 1 | 1a | 10 | 17 | — | 200 | 2 |
|   | 1b | 10 | 17 | — | 300 | 2-3 |
| 2 | — | — | 20.5-21 | (interpolated to 10% $H_2O$) | 200-300 | ~2-5 |
|   | 2 | 6.6 | 33 | 2.05 | 430 | 2 |
| 3 | 3a | 9.85 | 14 | — | 200 | 10-15 |
|   | 3b | 9.85 | 17 | — | 300 | 15 |
| 4 | 4a | ~7 | 2 | — | 200 | <1 |
|   | 4b | ~7 | 3½ | — | 300 | <1 |
| 5 | 5 | 5 | <1 | 0.43 | 450 | 2 |

It should be noted from Table II that, of the products 2 and 5 which were tested initially for impact strength by means of the notched Izod test, the product prepared with the methoxy polyethylene glycol propyl trimethoxy silane of 7.2 ethoxy repeat units (Product No. 2) had an Izod greater than 1 — its value was 2.05 ft-lb/inch of notch. Further evaluations of Dart Drop Impact strength of products made with other compatibility agents showed that Product No. 5 gave much lower impact strengths than Product No. 2, the latter having a Dart Drop Impact value of 33 ft-lb for the particular molding conditions used.

Note also from Tables II and III that the Product numbered 2 (which has 60 parts ATH) gives an impact strength of 33 ft-lb (other samples made with this same compatibility agent gave as high as 44 ft-lb and that a structural foam article molded as Product No. 8 (Table III), which has no ATH and a 0.85 specific gravity, has an impact strength of 28 ft-lb. The use of the selected silane compatibility agent acts as a coating applied to the ATH surface and helps to make the ATH more compatible with the HDPE. Note also that the Product No. 6, 60 parts ATH without any compatibility agent, has a very low impact strength — 1½ ft-lb in the Dart Drop test and 0.18 ft-lb/inch of notch in the Izod test.

TABLE III

| | MATERIAL | | | | Dart Drop 1 ¼" After Heat Agent 70° C ≧48 hrs (ft-lb) | Notched Izod (ft-lb/inch of notch) | Back Press (psi) |
|---|---|---|---|---|---|---|---|
| Prod No. | Parts HDPE | Parts ATH | Percent $H_2O$ | Solid or Foam and ρ | | | |
| 6 | 40 | 60 | 5 | Solid | 1½ | 0.18 | ~350 |
| 7 | 100 | 0 | 0 | Solid | >68 | — | — |
| 8 | 100 | 0 | 0 | Foam, ρ=.85 | 28 | — | — |
| 9 | 100 | 0 | 0 | Foam, ρ=.75 | 4 | — | — |
| 10 | 100 | 0 | 0 | Foam, ρ=.6 | ~3 | — | — |

Figure 4:
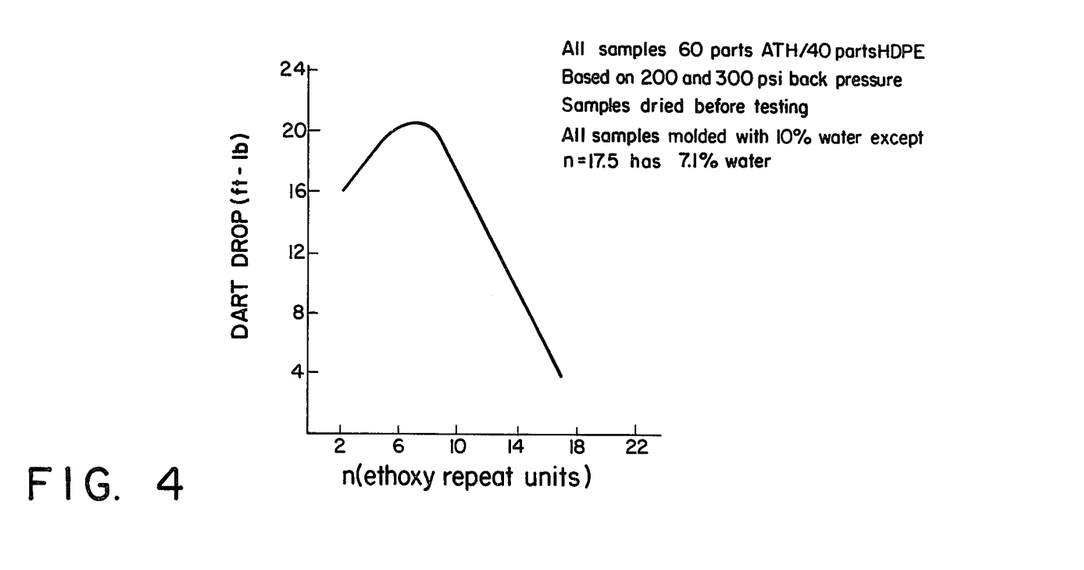
FIG. 4 is a curve showing the relationship between Dart Drop impact strength and the varying number of ethoxy repeat units of the silane coupling agent employed for otherwise identical practice of the process of the invention in the production of injection molded articles.

Referring to Table II hereinabove, the data for the products numbered 1, 2, 3, and 4 show that the curve of Dart Drop Impact versus Number of Repeat Units in the compatibility agent has a definite maximum. FIG. 4 of the drawings shows the graphical results. (Note that the Dart Drop value for $n = 7.2$ was interpolated to 9.9 percent water to match the percent water used for $n = 3$ and 11. At $n = 17.5$ the only data obtained were at 7.1 percent $H_2O$ and they were plotted directly.)

FIG. 4 shows a maximum of approximately 21 ft-lb at about $n = 7.2$ repeat units. Along with the specific compatibility agent used to treat the ATH, there are a number of other processing variables which directly affect the resultant molded article. The variables studied include: the back pressure applied to the mold, the compounding time, the percent water used in molding, and the percent compatibility agent on the ATH.

Figure 5:
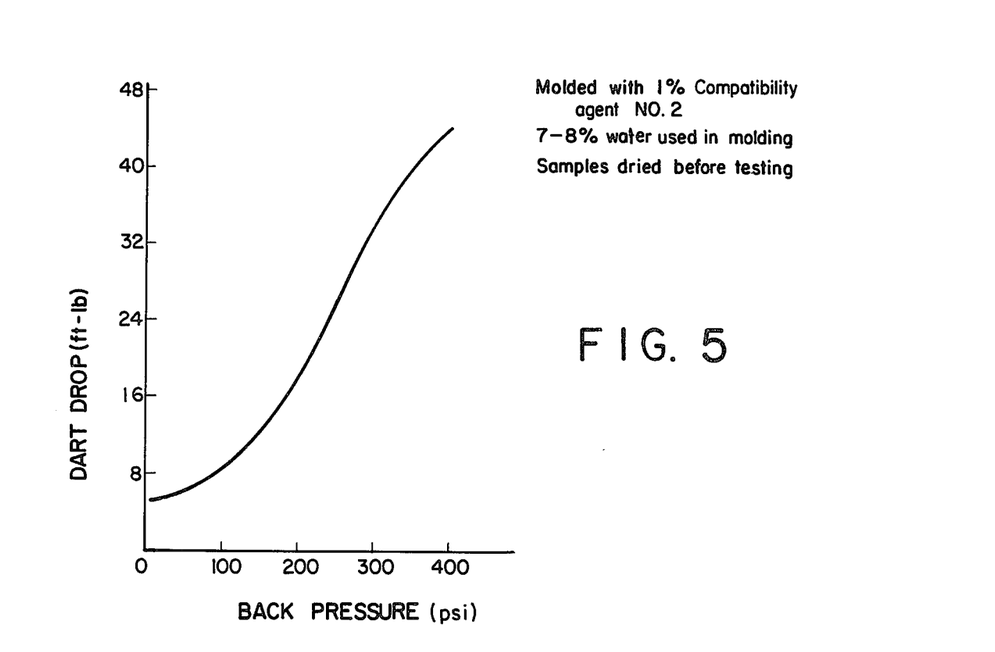
FIG. 5 is a curve showing the relationship between Dart Drop impact strength and the varying back pressure applied to the mold cavity for otherwise identical practice of the process of the invention in the production of molded articles.
Figure 6:
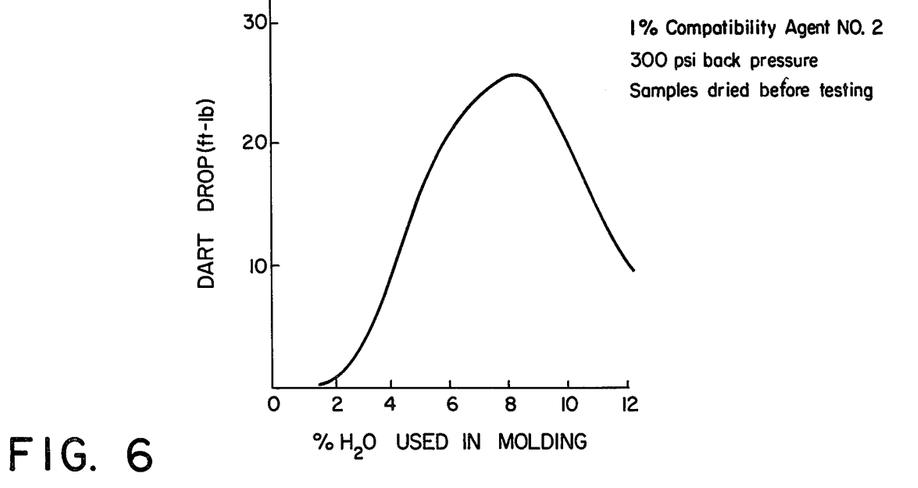
FIG. 6 is a curve showing the relationship between Dart Drop impact strength and the varying percentage of water used as a processing aid for otherwise identical practice of the process of the invention in the production of molded articles.

The pressure applied to the mold cavity prior to injection of the plastic is termed the back pressure. Parts molded at different back pressures have very different mechanical properties. As seen in FIG. 5, the Dart Drop Impact strength of samples molded at the specifications of Table IV show a significant increase with back pressure. Up to 400 psi back pressure, the Dart Drop Impact strengths increase to 44 ft-lb. Hence, to attain the largest impact strength, the back pressure should be in the 300-400 psi range.

TABLE IV

All of these articles were molded with 60 parts ATH, 40 parts HDPE (8 melt index, 0.96 spec. grav.) 1 part compatibility agent No. 2, and 7-8 percent water. Mold No. 2 at 70° C was used throughout. All samples were dried (70° C, ≧ 48 hours) before testing. All parts are by weight. In all cases, the extruder speed was 12 rpm and the press tonnage was 50 tons.

| Time Compounded in Banbury (Min) | Product No. | Back Pressure (psi) | ¼" Dart Drop Impact (Psi) | Fill Time (Sec) | Extr. Press. Discharge (Psi) |
|---|---|---|---|---|---|
| 4 | 11 | 0 | 3 | 1.5 | 2750 |
|   |   | 100 | 6 | 2 | 2750 |
|   |   | 200 | 30 | 3 | 2750 |
|   |   | 300 | 30 | 3 | 2750 |
|   |   | 400 | 44 | 3 | 2750 |
| 4 | 12 | 100 | 5 | 2 | — |
|   |   | 200 | 8 | 2½ | — |
|   |   | 300 | 30 | 2 | — |
| 10 | 13 | 0 | 5 | 1 | 3100 |
|   |   | 300 | 23 | 3 | 3100 |
| 10 | 14 | 100 | 8 | 2 | — |
|   |   | 200 | 24 | 2 | — |
|   |   | 300 | 40 | 4 | — |
| ~8 | 15 | 0 | 8 | 1 | ~3100 |
|   |   | 200 | 24 | 2 | ~3100 |
|   |   | 300 | 28 | 2½ | ~3100 |

The values for mechanical properties of the compounds made even with the same selected compatibility agent are not only dependent on the back pressure used in the molding, but also, and to a substantial extent, on the manner in which the compounds are made and the concentration of water used. Although any method of compounding of the treated-with-silane ATH and the polyethylene will produce a product which will feed into the extruder, the use of a Banbury has, to date, proved the most satisfactory. Any compounding procedure which fluxes and gives some history of high shear rate for a sufficiently long time should be satisfactory.

In terms of the Banbury operation, Table V shows that the Dart Drop Impact values are substantially lower for the case of either 3 minutes or 0 (zero) minutes of compounding after fluxing in the Banbury. Note also that the latter sample does not even pass the UL 94 V-0 test.

The last factor investigated which can greatly affect the mechanical properties, and impact strength in particular, of molded parts is the percent water used during the molding. Even though in all cases the samples were dried prior to testing, large differences in the impact strengths were found as a function of the concentration of water used for the molding process. This indicates that the presence of the water affects the interfacial action which can occur. The specific compatibility agent acts synergistically with certain concentrations of ft-lb); thus pointing out the necessity of the compatibility agent.

TABLE V

The HDPE used for this series of tests has a 0.96 specific gravity and 8 melt index and was present in the compound at 40 parts by weight. The ATH had a concentration of 60 parts and has a 1μ average particle size. The methoxy pohyethylene glycol propyl trimethoxy silane with 7.2 repeat units (compatibility agent No. 2 of Table II) was used throughout at the 1 part level. All samples were molded in Mold No. 2 against 300 psi back pressure. From scanning electron micrographs (1700×) and x-ray energy spectrographs, all three samples had excellent apparent dispersions of the ATH.

TABLE V (Continued)

| Time in Banbury for compounding (minutes) | Percent H$_2$O used in Molding | ¼" Dart Drop Impact after drying at 70° C ≧48 hrs (ft-lb) | Pass or Fail UL 94 V-0 Test ¼ Inch Thick | Product Number | Fill Time (sec) | Extr. Pres. barrel (psi) (pre-fluid) | Extr. Pres. discharge (psi) | Extr. RPM |
|---|---|---|---|---|---|---|---|---|
| 10 | 9.7 | 22 | Pass | 16 | 6 | 1100 | 2500 | 12 |
| 3 | 7.1 | 16 | Pass | 17 | 9½–13 | 1000 | 2500 | 18 |
| 0 | ~8 | 10 | Fail | 18 | 3 | — | 2300 | ~27 |

TABLE VI

All compounds prepared for 10 minutes in the Banbury; all specimens molded with 300 psi back pressure and all were oven dried (70° C, ≧ 48 hours) prior to testing. Mold No.2 used in all cases.

Figure 7:
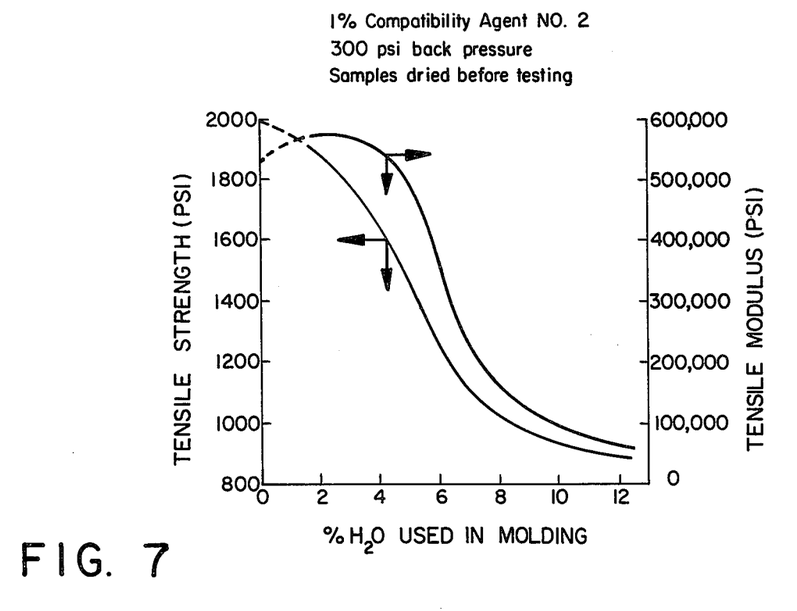
FIG. 7 is a set of curves showing both the tensile strength and tensile modulus as a function of varying percentage of water used as a processing aid in molding for otherwise identical practice of the process of the invention in the production of molded articles.
Figure 8:
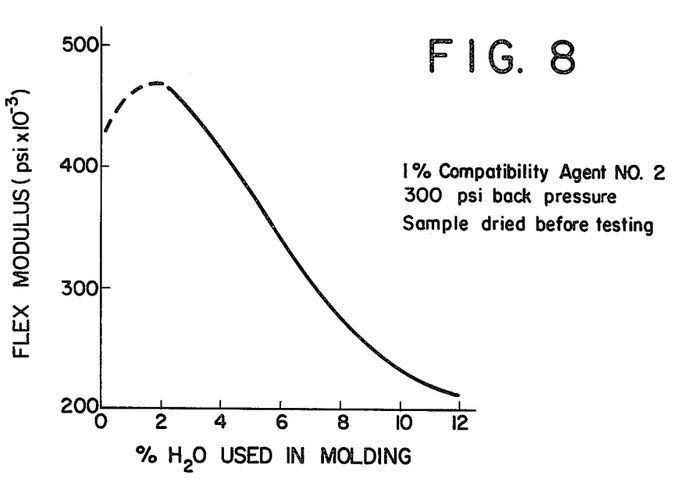
FIG. 8 is a curve showing the relationship between flex modulus and the varying percentage of water used as a processing aid for otherwise identical practice of the process of the invention in the production of molded articles.
Figure 9:
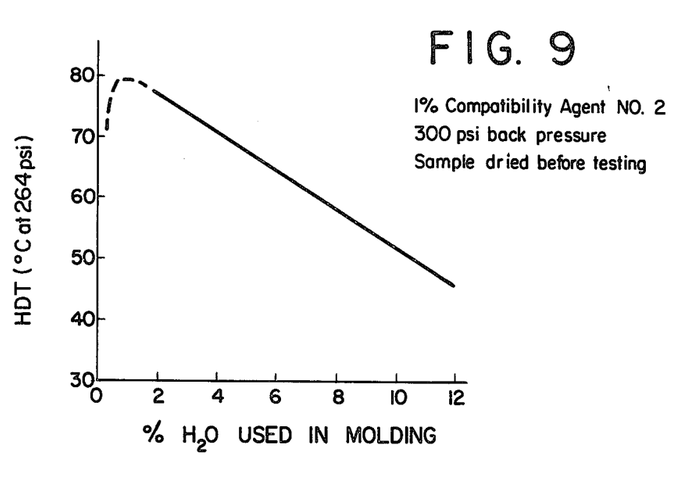
FIG. 9 is a curve showing the relationship between heat distortion temperature as a function of varying percentage of water used as a processing aid in otherwise identical practice of the process of the invention in the production of molded articles.

| Percent Compatibility Agent Number 2 | Percent H$_2$O used in Molding | ¼" Dart Drop Impact (ft-lb) | UL 94 V-O Pass/Fail ¼" thick | Product Number | MOLDING CONDITIONS Fill Time (sec) | Extr. Pres., barrel (psi) | Extr. Pres., discharge (psi) | Extr. RPM |
|---|---|---|---|---|---|---|---|---|
| 0 | 7.7 | 3 | Pass | 19 | ~20 | 1000 | 3200 | 12 |
| 0.5 | 6.7 | 26 | Pass | 20 | 21 | 0 | 2900 | 18 |
| 1.0 | 8.4 | 26 | Pass | 21 | 3–6 | 750 | 3000 | 18 |
| 2.4 | 8.4 | 22 | — | 22 | 1½ | — | 3100 | 18 |
| 3 | 8.8 | 22 | Marginal Pass | 23 | 3–4 | 0 | 2700 | 18 | water. Specifically, FIGS. 6, 7, 8 and 9 show how one can determine the concentration of water to use. For most cases it is expected that the maximum impact strength will be desirable (FIG. 6) even at the expense of tensile and flexural properties and heat distortion temperature (FIGS. 7, 8 and 9). If that is the case, approximately 8 percent water should be used in the molding. If slight decreases in impact strength are acceptable, the other mechanical properties can be increased by a decrease in the concentration of water used in molding. It is especially noteworthy that with no or very low concentration of water (< 2 percent), the impact strength is extremely low, < 1 ft-lb.

Another variable which must be considered is the level of compatibility agent used. The compatibility agent No. 2 was used to treat ATH. Compounds at 60 percent treated ATH/40 percent HDPE ($MI = 8$, spec. gr. 0.96) were prepared. As seen in Table VI, above 1 percent silane there is a slight loss in Dart Drop impact strength. Notice also that␣the 3 percent level of this coupling agent, the sample only marginally passes the UL 94 V-0 test. Good impact strengths can be obtained with approximately 1 percent concentration of compatibility agent No. 2. This is the preferred level. As expected, the use of the untreated ATH (zero percent silane) yields a product with poor impact strength (3

Further evidence of the reduced combustibility nature of the HDPE/ATH/silane product described, with preferred concentrations of 40/60/1 parts, respectively, was obtained from the Ohio State University — Rate of Heat Release and Smoke test and the Limiting Oxygen Index test. Table VII shows the conditions and results from these tests. Note that for the 60 percent ATH samples without compatibility agent (Product No. 24) and with compatibility agent (Product No. 25-27), there was no (zero) smoke generation and very low rate of heat release (maximum of 225 KW min/m$^2$. The structural foam article of Product No. 28 had a total of 865 smoke/m$^2$ and a total heat release of 1722 KW min/m$^2$. As a point of reference, the data for maple wood (Product No. 29) show that it has a total heat release of 883 KW min/m$^2$ and a smoke release of 148 smoke/m$^2$.

The Limiting Oxygen Index test measures the concentration of oxygen required in a specific chamber to just support combustion of a given size sample. As seen in Table VIII, the oxygen index of unfilled polyethylene is ~17.6 percent whereas the polyethylenes filled with 60 percent ATH (with or without compatibility agents) have oxygen indices of ~28 percent. This is a marked reduction of combustibility.

TABLE VII

All samples were prepared with HDPE (8 MI, 0.96 sp. gr.). The samples with ATH were prepared with 1 part of compatibility agent No. 2 except as noted in the table. All samples were oriented horizontally to the flame except Product No. 26 which was vertical. The heat flux was 2 watts/cm². Mold No. 2 was used to mold the articles. All samples were ¼ inch thick. Product No. 28 is a structural foam molded article of sp. gr. = 0.58.

TABLE VII

| Product No. | 24 | 25 | 26 | 27 | 28 | (Maple) 29 (Wood) |
|---|---|---|---|---|---|---|
| Parts of HDPE | 40 | 40 | 40 | 40 | 100 | 0 |
| Parts of ATH | 60 | 60 | 60 | 60 | 0 | 0 |
| Compatibility Agent (parts) | 0 | 1 | 1 | 1 | 0 | 0 |
| Percent H₂O | 5 | 8 | 7.6 | 7.6 | 0 | 0 |
| Back Pressure (psi) | 400–300 | 300 | 300 | 200 | — | 0 |
| Total Heat Release $\left(\frac{KW-\min}{m^2}\right)$ | 0 | 176 | 0 | 225 | 1722 | 883 |
| Total Smoke Release (Smoke/m²) | 0 | 0 | 0 | 0 | 865 | 148 |
| Weight loss from burn (gm) | 11.1 | 20.1 | 8.5 | 26.8 | 68.6 | 71.4 |
| Molding Conditions | | | | | | |
| Fill Time (sec.) | 7 | 3 | 2.5 | 2 | — | |
| Extr. Pressure Barrel (psi) | 1250 | 1000 | ~1000 | ~1000 | 1800 | |
| Extr., Pressure Discharge (psi) | 3500 | 3100 | ~3100 | ~3100 | 3400 | |
| Extr., Speed (RPM) | 12 | 12 | 12 | 12 | Set=2 | |
| Press Tonnage(tons) | 50 | 50 | 50 | 50 | 30 | |

TABLE VIII

The HDPE is the same as that used previously. Mold No. 1 was used and the samples were molded in the 50 ton press. The same ATH as described previously was used.

TABLE VIII

| Product Number | Parts HDPE | Parts ATH | Compatibility Agent and parts thereof | (b) LOI (%) | Fill Time (sec) | Extr. Pres. barrel (psi) | Extr. Pres. discha. (psi) | Extr. Speed RPM |
|---|---|---|---|---|---|---|---|---|
| 30 | 40 | 60 | No. 2/1 | 28.7 | 2 | 1100 | 3000 | 16 |
| 31 | 40 | 60 | — | 27.5 | 5 | 1100 | 3000 | 12 |
| (a) | 100 | — | — | 17.8, 17.4 | — | — | — | — |

(a) Robert J. Schwarz, "Fire Retardation of Polyethylene and Polypropylene," in William C. Kuryla and A. J. Papa, Flame Retardancy in Polymeric Materials, NY, M. Dekker, p. 83, Chapter 2, 1973.
(b) ASTM D 2863-70

It is to be noted that all melt index values set forth herein are in gm/10 min. and determined in accordance with ASTM-D-1238E specifications; all heat distortion temperatures determined in accordance with ASTM-D-648 specifications.

As referred to herein, the Dart Drop impact test consists of dropping a weighted dart (about 2 pounds) with a 1½ inch hemispherical tip into a specimen firmly fixed by a 3 inch diameter circular clamp. The failure is noted by the appearance of a slight crack on the surface of the part.

What is claimed is:

1. The process for the production of injection molded high density polyethylene articles having reduced combustibility and high impact strength comprising: maintaining a mold cavity at a preselected back pressure sufficiently high to substantially prevent foaming of a high density polyethylene material melt to be injected therein; injecting said melt into said mold cavity under pressure in excess of said back pressure to fill said mold cavity; said high density polyethylene material melt containing; (a) from about 50 to 70% by weight of alumina trihydrate, (b) from about 1 to 12% by weight of water as a processing aid, and (c) from about 0.5 to 3% by weight of a methoxy polyethylene glycol propyltrimethoxy silane having the formula:

$$CH_3O(C_2H_4O)_n C_3H_6 Si(OCH_3)_3,$$

wherein $n$ represents the average number of ethoxy repeat units between about 3.0 and 11.0.

2. The process in accordance with claim 1, wherein $n$ equals about 7.2.

3. The process in accordance with claim 1, wherein said high density polyethylene melt contains from about 55 to 65% by weight of alumina trihydrate.

4. The process in accordance with claim 2, wherein said high density polyethylene melt contains from about 55 to 65% by weight of alumina trihydrate.

5. The process in accordance with claim 4, wherein said high density polyethylene melt contains about 60% by weight of alumina trihydrate.

6. The process in accordance with claim 1, wherein said high density polyethylene melt is introduced into said mold cavity at a pressure of the order of about 2500 to 3500 psi.

7. The process in accordance with claim 1, wherein said mold cavity is maintained at a back pressure of about 200 to 450 psi.

8. The process in accordance with claim 7, wherein said mold cavity is maintained at a back pressure of about 300 to 400 psi.

* * * * *